United States Patent
Song et al.

(10) Patent No.: US 9,088,437 B2
(45) Date of Patent: Jul. 21, 2015

(54) METHOD AND DEVICE FOR PROCESSING SOURCE ROLE INFORMATION

(75) Inventors: Yubing Song, Beijing (CN); Xiaopeng Yang, Beijing (CN)

(73) Assignee: HANGZHOU H3C TECHNOLOGIES CO., LTD., Zhejiang (CN)

(*) Notice: Subject to any disclaimer, the term of this patent is extended or adjusted under 35 U.S.C. 154(b) by 393 days.

(21) Appl. No.: 13/699,540

(22) PCT Filed: May 24, 2011

(86) PCT No.: PCT/CN2011/074568
§ 371 (c)(1),
(2), (4) Date: Nov. 21, 2012

(87) PCT Pub. No.: WO2011/147305
PCT Pub. Date: Dec. 1, 2011

(65) Prior Publication Data
US 2013/0064247 A1 Mar. 14, 2013

(30) Foreign Application Priority Data

May 24, 2010 (CN) .......................... 2010 1 0187359

(51) Int. Cl.
*H04L 12/46* (2006.01)
*H04L 29/06* (2006.01)
(52) U.S. Cl.
CPC ........ *H04L 12/4641* (2013.01); *H04L 12/4645* (2013.01); *H04L 12/4675* (2013.01); *H04L 63/101* (2013.01)
(58) Field of Classification Search
CPC ..................... H04L 29/06095; H04L 29/0653; H04L 49/3009; H04L 49/309
See application file for complete search history.

(56) References Cited

U.S. PATENT DOCUMENTS

| | | | | |
|---|---|---|---|---|
| 6,161,139 A * | 12/2000 | Win et al. | ...................... | 709/225 |
| 6,182,142 B1 * | 1/2001 | Win et al. | ...................... | 709/229 |
| 7,093,005 B2 * | 8/2006 | Patterson | ...................... | 709/220 |
| 8,194,570 B2 * | 6/2012 | Mohamed et al. | ............ | 370/254 |
| 8,356,093 B2 * | 1/2013 | Koizumi et al. | .............. | 709/223 |
| 8,423,042 B2 * | 4/2013 | Markhovsky et al. | ...... | 455/456.1 |
| 8,490,151 B2 * | 7/2013 | Boldyrev et al. | ................. | 726/1 |
| 8,627,413 B2 * | 1/2014 | Youngworth | ..................... | 726/4 |
| 8,700,891 B2 * | 4/2014 | Qi et al. | ......................... | 713/153 |
| 2002/0103889 A1 * | 8/2002 | Markson et al. | ............... | 709/223 |
| 2003/0088576 A1 * | 5/2003 | Hattori et al. | ............. | 707/103 R |
| 2006/0067317 A1 * | 3/2006 | Engstrand et al. | ............ | 370/389 |
| 2006/0090208 A1 * | 4/2006 | Smith | ............................ | 726/26 |

(Continued)

FOREIGN PATENT DOCUMENTS

| CN | 101146016 | 3/2008 |
|---|---|---|
| CN | 101155113 | 4/2008 |

OTHER PUBLICATIONS

International Search Report and Written Opinion dated Sep. 1, 2011, PCT Patent Application No. PCT/CN2011/074568 filed May 24, 2011, The State Intellectual Property Office, the P.R. China.

(Continued)

*Primary Examiner* — Hassan Phillips
*Assistant Examiner* — Prenell Jones
(74) *Attorney, Agent, or Firm* — Mannava & Kang, P.C.

(57) ABSTRACT

A method and device for processing source role information in which a source role tag is inserted into a packet as an inner VLAN tag of the packet and used to perform role based access control processing for the packet.

20 Claims, 6 Drawing Sheets

(56) References Cited

U.S. PATENT DOCUMENTS

| | | |
|---|---|---|
| 2006/0112431 A1 | 5/2006 | Finn et al. |
| 2006/0245439 A1* | 11/2006 | Sajassi ............................ 370/400 |
| 2008/0001713 A1* | 1/2008 | Dasgupta et al. ............. 340/10.1 |
| 2008/0219268 A1* | 9/2008 | Dennison .................... 370/395.2 |
| 2009/0049196 A1 | 2/2009 | Smith et al. |
| 2009/0097490 A1 | 4/2009 | Sanderson et al. |
| 2009/0141729 A1* | 6/2009 | Fan ............................... 370/401 |
| 2009/0217355 A1 | 8/2009 | Smith |
| 2009/0252058 A1 | 10/2009 | Chen et al. |
| 2009/0254877 A1* | 10/2009 | Kuriakose et al. ............. 717/105 |
| 2009/0307751 A1* | 12/2009 | Lin et al. ............................ 726/3 |
| 2010/0106791 A1* | 4/2010 | Dai et al. ........................ 709/206 |
| 2010/0318662 A1* | 12/2010 | Wie et al. ....................... 709/226 |
| 2011/0004923 A1* | 1/2011 | Smith ................................ 726/4 |

OTHER PUBLICATIONS

Extended European Search Report dated Jun. 16, 2014 issued on EP Patent Application No. 11786077.5 dated May 24, 2011, European Patent Office, 8 pages.

CN First Office Action dated Jul. 16, 2013 issued on CN Patent Application No. 201010187359.6 dated May 24, 2010, The State Intellectual Property Office, P.R. China.

* cited by examiner

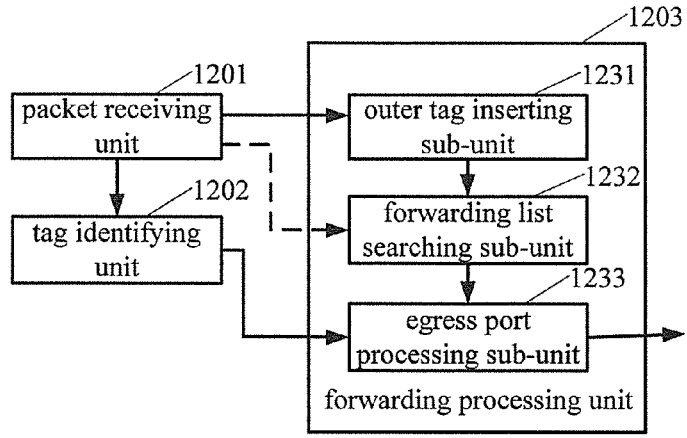

Figure 12

| Octet 1 | Octet 2 | Octet 3 | Octet 4 |
|---|---|---|---|
| \multicolumn{4}{c}{Source mac address(cotet1-4)} | | | |

| | Octet 1 | Octet 2 | Octet 3 | Octet 4 |
|---|---|---|---|---|
| | Source mac address(cotet1-4) ||||
| | Source mac address(octet5-6) || Destination mac address(octet1-2) ||
| | Destination mac address(octet3-6) ||||
| inner VLAN tag (source role tag) | TPID (source value other than 0x8100) | Priority (3bit) | CFI (1bit) | Vlan ID (12bit) |
| | payload ||||

Figure 13

| | Octet 1 | Octet 2 | Octet 3 | Octet 4 |
|---|---|---|---|---|
| | Source mac address(cotet1-4) ||||
| | Source mac address(octet5-6) || Destination mac address(octet1-2) ||
| | Destination mac address(octet3-6) ||||
| outer VLAN tag | TPID(0x8100) | Priority (3bit) | CFI (1bit) | Vlan ID (12bit) |
| inner VLAN tag (source role tag) | TPID (source value other than 0x8100) | Priority (3bit) | CFI (1bit) | Vlan ID (12bit) |
| | payload ||||

Figure 14

METHOD AND DEVICE FOR PROCESSING SOURCE ROLE INFORMATION

CLAIM FOR PRIORITY

The present application is a national stage filing under 35 U.S.C 371 of PCT application number PCT/CN2010/074568, having an international filing date of May 24, 2011, which claims priority to Chinese Patent Application No. 201010187359.6, filed on May 24, 2010, the disclosures of which are hereby incorporated by reference in their entireties.

BACKGROUND OF THE INVENTION

A user should be verified when accessing a network to guarantee the security of the network, and after the verification is passed, access rights of the user should be limited by using an access control method, e.g., the access rights of the user are limited by configuring an Access Control List (ACL). One type of conventional access control method is based on IP addresses. This has the disadvantage that a large number of ACLs are configured and the configuration and management workload is high due to change of IP addresses.

BRIEF DESCRIPTION OF THE DRAWINGS

FIG. 12 is a schematic diagram illustrating the structure of an intermediate device in accordance with an example.

FIG. 13 is a schematic diagram of a data packet with a source role tag.

FIG. 14 is a schematic diagram of a data packet with a source role tag and an outer VLAN tag.

DETAILED DESCRIPTION

In one example a role based access control method comprises: allocating a source role tag to a user, allocating a destination role information to a server, and performing access control processing by configuring an RBACL based on the source role tag and the destination role information. The role based access control method may thought of as combining several ACLs based on different IP addresses into one ACL based on role information including source role information regarding to the user and destination information regarding to the server. This reduces the number of ACLs. Moreover, no matter how the IP addresses change, the role tags do not change, and thus role based ACL does not change and configuration and management workload is reduced.

Figure 1:
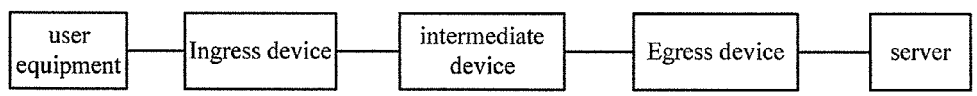
FIG. 1 is a schematic diagram illustrating a role based access control structure in accordance with one example.

An example of a role based access control structure is shown in FIG. 1. User equipment obtains a source role after passing verification, and source role information is stored in an Ingress device; a resource side device (a server is taken as an example in FIG. 1) obtains a destination role after passing verification, and destination role information is stored in an Egress device; a Role Based Access Control List (RBACL) is configured. The user equipment transmits a packet to the Ingress device, the Ingress device adds the source role information of the user equipment into the packet and forwards the packet to an intermediate device, and the packet always contains the source role information during a subsequent forwarding procedure until the packet is forwarded to the Egress device. After receiving the packet, the Egress device determines the destination role information of the packet, matches the source role information and the destination role information with items in the RBACL, and performs access control processing for the packet according to a matching result. The access control processing includes permitting forwarding, rejecting forwarding, limiting a forwarding speed and so on. It should be noted that, in the structure shown in FIG. 1, the Ingress device and the Egress device may be configured in a layer-2 network or a layer-3 network, a common network device may be configured between the user equipment and the Ingress device or between the Egress device and the server, and a middle network device may be configured between the Ingress device and the Egress device.

Various methods have been used to carry source role information in a packet. However, these previous methods have tended to require significant changes to the network hardware. Where such changes are extensive, they can be prohibitively expensive.

A method for processing source role information provided in one example comprises: after receiving a packet from user equipment, an Ingress device determines a source role tag according to source information of the packet, inserts the source role tag into the packet as an inner Virtual Local Area Network (VLAN) tag of the packet, and forwards the packet, where the source role tag corresponds to a role of the user equipment; if there is an intermediate device between the Ingress device and an Egress, the intermediate device keeps the source role tag as the inner VLAN tag unchangeable during a subsequent forwarding procedure until the packet is forwarded to the Egress device; the Egress device obtains the source role tag as the inner VLAN tag from the packet, and performs role based access control processing for the packet according to the source role tag.

The above method utilizes existing QinQ function of network devices. The Ingress device inserts the source role tag as the inner VLAN tag into the packet, the intermediate device keeps the source role tag as the inner VLAN tag unchangeable and the Egress device obtains the source role tag as the inner VLAN tag from the packet. Accordingly, the functions of conventional devices can be compatible with this method, and do not need to be modified greatly.

The source information of the packet in the above method may include: information of the Ingress device's ingress port receiving the packet, source address information of the packet, a layer-4 port number, layer-3 protocol number and application layer protocol number of the packet, etc.

Performing role based access control processing for the packet by the Egress device may include: obtaining the source role tag from the received packet, determining destination role information of the packet, matching the source role tag and the destination role information with items in the RBACL, and performing access control processing for the packet according to a matching result.

The above method will be described hereinafter in detail with reference to specific examples. Based on the role based access control structure shown in FIG. 1, there are four application cases.

Figure 2:
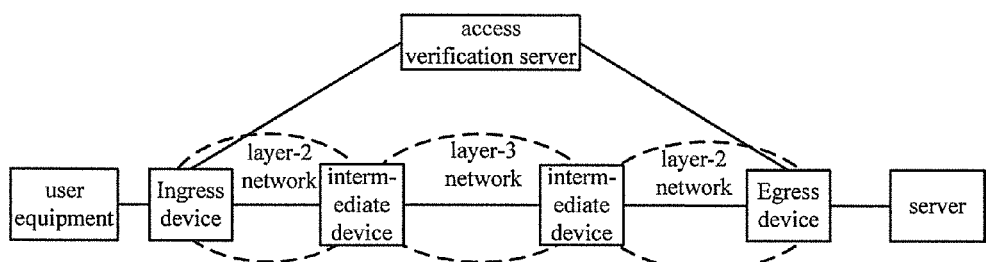
FIG. 2 is a schematic diagram illustrating a first application case in accordance with one example.

A first application case: as shown in FIG. 2, user equipment is directly connected to an Ingress device, is connected to an intermediate device through a layer-2 network, and then is connected to a layer-3 network through the intermediate device. A server is directly connected to an Egress device, is connected to an intermediate device through a layer-2 network, and then is connected to the layer-3 network through the intermediate device. All devices between the Ingress device and the Egress device could be taken as intermediate devices. The Ingress device and the Egress device directly interact with an access verification server.

Figure 3:
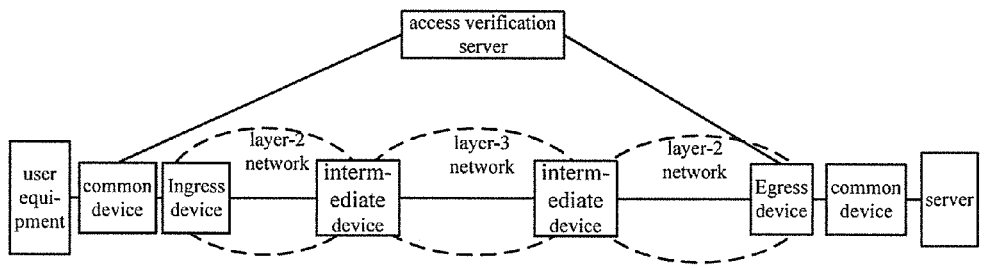
FIG. 3 is a schematic diagram illustrating a second application case in accordance with an example.

A second application case: as shown in FIG. 3, user equipment is connected to an Ingress device through a common device, is connected to an intermediate device through a layer-2 network, and then is connected to a layer-3 network through the intermediate device. A server is connected to an Egress device through a common device, is connected to an intermediate device through a layer-2 network, and then is connected to the layer-3 network through the intermediate device. All devices between the Ingress device and the Egress device may be taken as intermediate devices. The common devices interact with an access verification server and transmit source role information of the user equipment passing the verification to the Ingress device.

Figure 4:
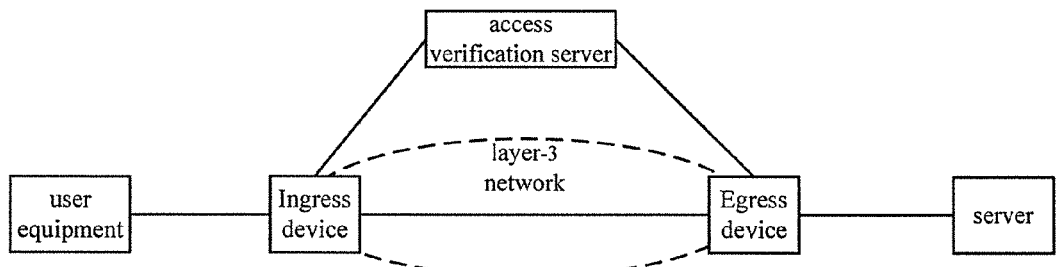
FIG. 4 is a schematic diagram illustrating a third application case in accordance with an example.

A third application case: as shown in FIG. 4, different from the first application case, the user equipment and the server are directly connected to the Ingress device and the Egress device respectively, and the Ingress device and the Egress device perform layer-3 forwarding processing.

Figure 5:
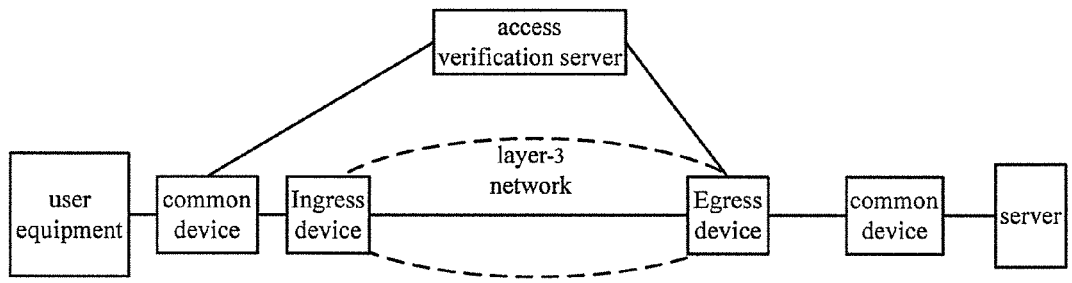
FIG. 5 is a schematic diagram illustrating a fourth application case in accordance with an example.

A fourth application case: as shown in FIG. 5, different from the third application case, the user equipment and the server are connected to the Ingress device and the Egress device respectively through common devices, and the common devices interact with an access verification server, and transmit source role information of the user equipment passing the verification to the Ingress device.

The common devices in the above application cases are all network devices having no tag inserting and processing function.

In the examples of the present invention, the Ingress device stores a corresponding relation between the source information of the packet and the source role tag, and the Egress device stores the RBACL. The corresponding relation between the source information of the packet and the source role tag and the RBACL may be configured by using a manual configuration mode or a verification mode. The verification mode will be described hereinafter in detail.

For the Ingress device, configuring the corresponding relation between the source information of the packet and the source role tag by using the verification mode includes: determining the source role information of the verified user equipment and the source information of the packet transmitted by the verified user equipment, applying the corresponding relation between the source information of the packet and the source role tag to a hardware plane of the Ingress device. The source information of the packet includes: the information of the Ingress device's ingress port receiving the packet, the source address information of the packet, a layer-4 port number, layer-3 protocol number and application layer protocol number of the packet etc.

According to the different application cases, methods for determining the source role information of the user equipment passing the verification and the source information of the packet by the Ingress device are different, which will be described by taking two examples.

Figure 6:
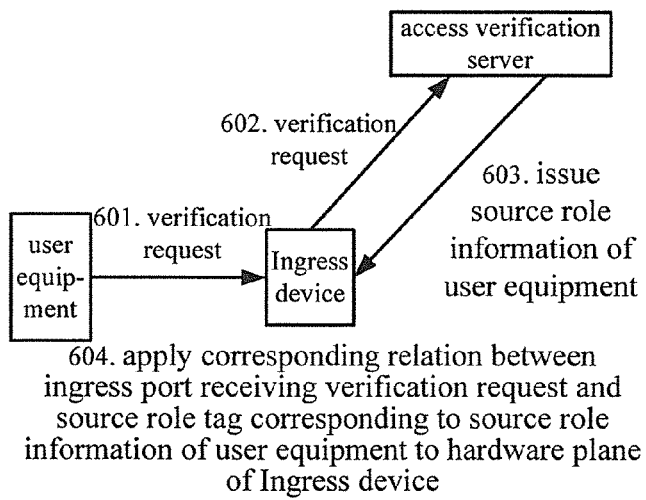
FIG. 6 is a schematic diagram illustrating a method that an Ingress device configures a corresponding relation by using a verification mode in accordance with an example.

In an example, if the user equipment is directly connected to the Ingress device and the Ingress device directly interacts with the access verification server, which corresponds to the above first and third application cases, the procedure of configuring by the Ingress device the corresponding relation between the source information of the packet and the source role tag by using the verification mode is shown in FIG. 6 and includes the following steps.

Step 601, the user equipment initiates a verification request to the Ingress device.

Step 602, the Ingress device forwards the verification request to the access verification server.

Step 603, the access verification server issues the source role information of the user equipment to the Ingress device after the user equipment passes the verification.

Step 604, the Ingress device applies a corresponding relation between the Ingress device's ingress port receiving the verification request and the source role tag corresponding to the source role information of the user equipment to the hardware plane of the Ingress device. Applying by the Ingress device the corresponding relation between the Ingress device's ingress port receiving the verification request and the source role tag corresponding to the role information of the user equipment to the hardware plane of the Ingress device includes: converting by the Ingress device the source role information of the user equipment into the source role tag, and applying the corresponding relation between the Ingress device's ingress port receiving the verification request and the source role tag to the hardware plane of the Ingress device.

In this example, the Ingress device's ingress port is taken as the source information of the packet. When the corresponding relation is applied, the source role tag could be inserted into a field of the received packet as an inner VLAN tag at the Ingress device's ingress port. FIG. 13 shows the schematic diagram of the packet having the source role tag. Since the Ingress device has the QinQ function, the Ingress device adds two layers of VLAN fields after receiving the packet through the ingress port. The inner VLAN field is the source role tag that contains the role information of the user equipment, and the outer VLAN field is used for data forwarding. FIG. 14 shows the schematic diagram of the packet having the source role tag and the outer VLAN tag.

Figure 7:
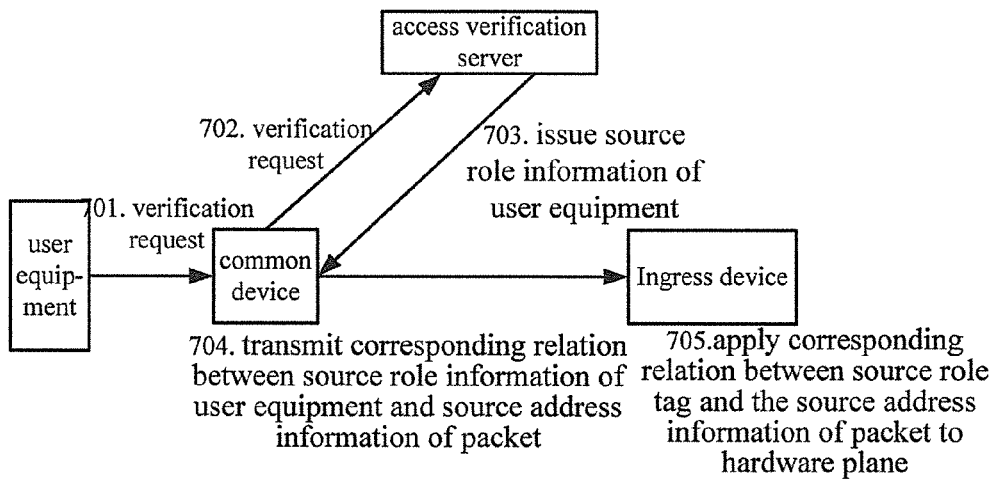
FIG. 7 is a schematic diagram illustrating a method that an Ingress device configures a corresponding relation by using a verification mode in accordance with another example.

In another example, if the user equipment is connected to the Ingress device through a common device and the common device interacts with the access verification server, which corresponds to the above second and fourth application cases, the procedure of configuring by the Ingress device the corresponding relation between the source information of the packet and the source role tag by using the verification mode is shown in FIG. 7 and includes the following steps.

Step 701, the user equipment initiates a verification request to the common device.

Step 702, the common device forwards the verification request to the access verification server.

Step 703, the access verification server issues the source role information of the user equipment to the common device after the user equipment passes the verification.

Step 704, the common device transmits a corresponding relation between the source role information of the user equipment and the source address information of the verification request to the Ingress device.

Step 705, the Ingress device applies the corresponding relation between the source role tag corresponding to the source role information of the user equipment and the source address information of the verification request of the user equipment to the hardware plane of the Ingress device.

In this example, the source address information of the packet is taken as the source information of the packet, and the source address information may be a source IP address or a source MAC address. After the corresponding relation is applied to the hardware plane of the Ingress device, the corresponding relation between the source role tag and the source address information (i.e., the source address information of the verification request of the user equipment) may be stored in a hardware list, and subsequently the Ingress device searches the hardware list according to the source address information of the packet to determine the source role tag.

Figure 8:
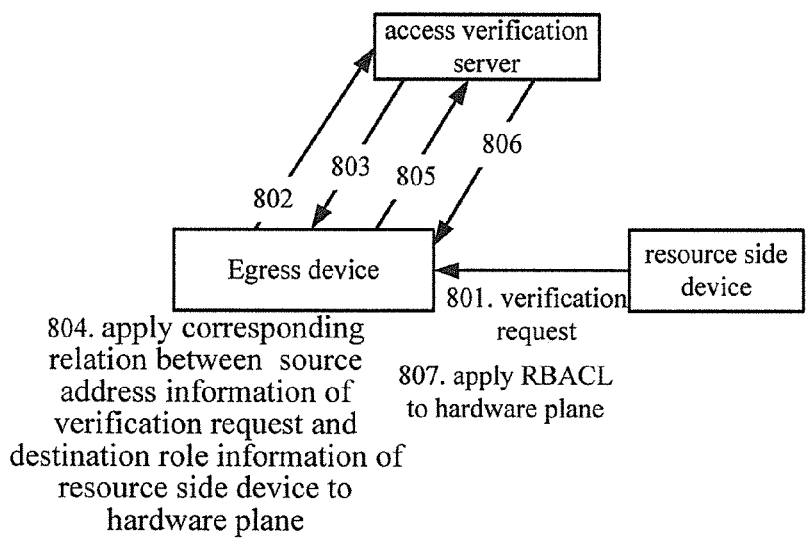
FIG. 8 is a schematic diagram illustrating a method that an Egress device configures a RBACL by using a verification mode in accordance with an example.

For the Egress device, configuring the RBCAL by using the verification mode is shown in FIG. 8 and includes the following steps.

Step 801, the Egress device receives a verification request from a resource side device.

The verification request may be directly transmitted to the Egress device by the resource side device or be transmitted to the Egress device by the resource side device through a common device. In this example, the resource side device is a server.

Step 802, the Egress device forwards the verification request to the access verification server.

Step 803, the access verification server issues the destination role information of the resource side device to the Egress device after the resource side device passes the verification.

Step 804, the Egress device applies a corresponding relation between the source address information of the verification request from the resource side device and the destination role information of the resource side device to a hardware plane of the Egress device.

The corresponding relation between the source address information of the verification request from the resource side device and the destination role information of the resource side device is applied to the hardware plane of the Egress device, so that the Egress device can search this corresponding relation according to the destination address information of the packet from the user equipment while performing access control processes, to determine a destination role information corresponding to destination address information in the packet from the user equipment, which will be described hereinafter.

In addition, the corresponding relation between the source address information of the verification request from the resource side device and the destination role information of the resource side device may be stored in a hardware list, e.g., a layer-2 forwarding list or a layer-3 forwarding list, and the destination role information in the hardware list does not influence forwarding functions, has unique meaning and is special, so as to avoid function interference.

Step 805, the Egress device requests the access verification server for a role based control policy in which the destination role information of the resource side device is taken as a destination role.

Step 806, the access verification server issues the role based control policy in which the destination role information of the resource side device is taken as the destination role to the Egress device.

Generally, all role based control policies are configured in the access verification server in advance, and after receiving the quest in the step 805, the access verification server issues all role based control policies in which the destination role information of the resource side device is taken as the destination role to the Egress device. The contents of each item in the role based control policies include source role information, destination role information and access control processing modes (which include permit, deny, rate limit, mirror, redirect, priority re-mark, statistic and further matching other packet fields).

Step 807, the Egress device converts source role information in the role based control policies into the source role tag, obtains a RBACL, and applies the RBACL to the hardware plane of the Egress device; wherein, each item in the RBACL contains the source role tag, the destination role information and the access control processing mode.

Since the changes of the user equipment address information does not affect the source role information of the user equipment, the source role tag corresponding to the role information of the user equipment does not change. Therefore, the RBACL applied to the hardware plane of the Egress device could keep unchangeable due to source role tag contained in the RBACL. In addition, the RBACL could be applied at the egress port of the Egress device or be applied globally in the Egress Device.

The access control processing implemented in the hardware plane during the packet forwarding procedure will be described hereinafter in detail.

After receiving the packet from the user equipment, the Ingress device determines the source role tag according to the source information of the packet, inserts the source role tag into the packet as the inner VLAN tag of the packet and forwards the packet. If the Ingress device is located in the layer-2 network, the Ingress device performs layer-2 forwarding processing for the packet, and if the Ingress device is located in the layer-3 network, the Ingress device performs layer-3 forwarding processing for the packet.

The source role tag inserted into the packet by the Ingress device corresponds to the role of the user equipment, and the user equipment may be an actual network entity or a logic entity, e.g. an application protocol in a network device. Different roles may be respectively configured for different application protocols and correspond to different source role tags.

Inserting the source role tag into the packet by the Ingress device may be performed when the Ingress device's ingress port receives the packet, when the Ingress device's egress port forwards the packet, or at any moment after the packet is received and before the packet is forwarded. The following technical solutions are described by taking an example that the source role tag is inserted into the packet when the Ingress device's ingress port receives the packet.

According to the above four application cases, a procedure of processing the packet by the Ingress device will be described hereinafter.

In the first application case shown in FIG. 2, the packet received by the Ingress device does not contain a tag, and thus is marked as an untag packet. After receiving the packet, the Ingress device determines the source role tag according to the ingress port and the ACL, determines an outer VLAN tag (Vtag), inserts the source role tag as the inner VLAN tag into the packet, and inserts the Vtag into the packet. Of cause, if there are packets which the source role tag does not need to be inserted into in the flow of the VLAN of the egress port, e.g. packets are outputted at predetermined of CPU or no source role tag is configured at the ingress port, the operation of inserting the source role tag is not performed, and only the operation of inserting the Vtag is performed. The above processing is also applied to the following examples, and will not be further described.

It should be noted that the Ingress device may determine the source role tag and the Vtag according to the ingress port or according to the ACL configured at the ingress port. For example, the items containing the source role tag corresponding to the source address information or protocol number of the packet could be configured in the ACL of the ingress port in advance, and after receiving the packet, the Ingress device may determine the source role tag by matching the items in the ACL.

The processing performed by the intermediate device and the Egress device is the same as that performed by the Ingress device, and will not be further described hereinafter. The following technical solutions are described by taking an example that the source role tag and the Vtag are determined according to the ingress port.

In addition, the Vtag is used for forwarding the packet, which could be learned from in the prior art and is not modified in the present invention. After being determined, the Vtag may be inserted into the packet or be not inserted into the packet, which is not limited by the present invention. The technical solutions of the present invention are described by taking an example of inserting the Vtag into the packet.

The Ingress device searches the layer-2 forwarding list according to the Vtag and a destination MAC address of the packet to determine an egress port, and forwards the packet containing the Vtag and source role tag through the determined egress port of the Ingress device. If a Vtag stripping function is configured at the egress port of Ingress device, the Ingress device strips the Vtag from the packet firstly, and then forwards the packet containing the source role tag.

In the second application case shown in FIG. 3, the packet received by the Ingress device contains the Vtag, the Ingress device searches the corresponding relation between the source address information of the packet and the source role tag according to the source address information, determines the source role tag corresponding to the source address information, and inserts the source role tag as the inner VLAN tag into the packet.

The Ingress device searches the layer-2 forwarding list according to the Vtag and the destination MAC address of the packet to determine an egress port of the Ingress device, and forwards the packet containing the Vtag and the source role tag through the determined egress port. If a Vtag stripping function is configured at the egress port of the Ingress device, the Ingress device strips the Vtag from the packet firstly, and then forwards the packet containing the source role tag.

In the third application case shown in FIG. 4, the packet received by the Ingress device is an untag packet. After receiving the packet, the Ingress device searches the corresponding relation between the ingress port and the source role tag according to the ingress port, determines the source role tag corresponding to the ingress port, determines the Vtag corresponding to the ingress port, inserts the source role tag as the inner VLAN tag of the packet into the packet, and inserts the Vtag into the packet.

The Ingress device searches the layer-3 forwarding list according to the Vtag and a destination IP address of the packet to determine an egress port of the Ingress device, and forwards the packet through the determined egress port after performing replacement processing for the Vtag, the source MAC address and the destination MAC address. The forwarded packet contains a new Vtag and the source role tag. If a Vtag stripping function is configured at the egress port, the Ingress device strips the new Vtag from the packet firstly, and then forwards the packet only containing the source role tag.

In the fourth application case shown in FIG. 5, the packet received by the Ingress device contains the Vtag. The Ingress device searches the corresponding relation between the source address information of the packet and the source role tag according to the source address information, determines the source role tag corresponding to the source address information, and inserts the source role tag as the inner VLAN tag of the packet into the packet.

The Ingress device searches the layer-3 forwarding list according to the Vtag and the destination IP address of the packet to determine an egress port, and forwards the packet through the determined egress port after performing replacement processing for the Vtag, the source MAC address and the destination MAC address. The forwarded packet contains a new Vtag and the source role tag. If a Vtag stripping function is configured at the egress port, the Ingress device strips the new Vtag from the packet firstly, and then forwards the packet only containing the source role tag.

In the above processing procedure of the Ingress device, when the source role tag as the inner VLAN tag of the packet is inserted into the packet, a Tag Protocol Identifier (TPID) of the inner VLAN tag adopts a preset value unequal to 0x8100 to identify the inner VLAN tag as the source role tag. The TPID of the source role tag could be configured globally in the network in which the Ingress Device located.

It should be noted that in some cases (e.g. in a case that the packet is a packet outputted at predetermined port of the CUP or the ingress port is configured not to insert the source role tag into the packet), the source role tag does not need to be inserted into the received packet; if the packet in this case and the packet containing the source role tag are forwarded through the same egress port, the two packets can keep respective formats and do not influence with each other.

After receiving the packet, the intermediate device keeps the source role tag as the inner VLAN tag of the packet unchangeable during the layer-2 or layer-3 forwarding procedure. In other words, if the intermediate device determines that the inner VLAN tag is the source role tag through the TPID of the inner VLAN tag, the intermediate device keeps the inner VLAN tag unchangeable.

The layer-2 or layer-3 forwarding processing performed by the intermediate device for the packet is the same as that performed by the Ingress device. In the first application case shown in FIG. 2, the packet received by the intermediate device only contains the source role tag. The intermediate device determines the Vtag corresponding to the intermediate device's ingress port, and inserts the Vtag into the packet. The intermediate device searches the layer-2 forwarding list according to the Vtag and the destination MAC address of the packet to determine an egress port of the intermediate device, and forwards the packet through the determined egress port. If a Vtag stripping function is configured at the egress port of the intermediate device, the intermediate device strips the new Vtag from the packet firstly, and then forwards the packet only containing the source role tag.

In the second application case shown in FIG. 3, the packet received by the intermediate device contains the Vtag and the source role tag. The intermediate device searches the layer-2 forwarding list according to the Vtag and the destination MAC address of the packet to determine an egress port, and forwards the packet containing the Vtag and the source role tag through the determined egress port. If a Vtag stripping function is configured at the egress port, the intermediate device strips the Vtag from the packet firstly, and then forwards the packet only containing the source role tag.

In the third application case shown in FIG. 4, the packet received by the intermediate device only contains the source role tag. The intermediate device determines the Vtag corresponding to the intermediate device's ingress port, and inserts the Vtag into the packet. The intermediate device searches the layer-3 forwarding list according to the Vtag and the destination IP address of the packet to determine an egress port, and forwards the packet through the determined egress port. The forwarded packet contains the Vtag and the source role tag. If a Vtag stripping function is configured at the determined egress port of intermediate device, the intermediate device strips the new Vtag from the packet firstly, and then forwards the packet only containing the source role tag.

In the fourth application case shown in FIG. 5, the packet received by the intermediate device contains Vtag and the source role tag. The intermediate device searches the layer-3 forwarding list according to the Vtag and the destination IP address of the packet to determine an egress port, and forwards the packet through the determined egress port after performing replacement processing for the Vtag, the source MAC address and the destination MAC address. The forwarded packet contains a new Vtag and the source role tag. If a Vtag stripping function is configured at the egress port, the intermediate device strips the new Vtag from the packet firstly, and then forwards the packet only containing the source role tag.

When receiving the packet forwarded by the intermediate device, the Egress device searches the applied corresponding relation in the step 804 shown in FIG. 8, determines destination role information corresponding to the destination address (e.g., an destination IP address) of the packet, obtains the source role tag as the inner VLAN tag from the packet, matches the source role tag and the destination role information with items in the RBACL, and performs access control processing for the packet according to a matching result.

In the step 807 shown in FIG. 8, the Egress device applies the RBACL to the hardware plane, and the RBACL contains the source role tag, destination role information and access control processing modes. After matching the source role tag and the destination role information with the items in the RBACL, if there is an item which can match with the source role tag and the destination role information successfully, an access control processing mode is determined, e.g. permit, deny, rate limit, mirror, redirect, priority re-mark, statistic and further matching other packet fields.

In addition, the Egress device also performs layer-2 or layer-3 forwarding processing inside the Egress device besides the above access control processing. The processing procedure inside the Egress device will be described according to the above four application cases hereinafter in detail.

In the first application case shown in FIG. 2, the packet received by the Egress device contains the source role tag and the Vtag or only contains the source role tag.

If the packet only contains the source role tag, when determining that the inner VLAN tag is the source role tag according to the TPID of the inner VLAN tag, the Egress device obtains the source role tag, determines the Vtag according to the Egress device's ingress port, and inserts the Vtag into the packet. The Egress device searches the layer-2 forwarding list according to the Vtag and the MAC address to determine an egress port, determines destination role information corresponding to the destination address of the packet, matches the source role tag and the destination role information with the items in the RBACL, and performs access control processing for the packet according to a matching result. For example, if the matching result is permit, the Egress device forwards the packet through the determined egress port of the Egress device after stripping both the inner tag and the outer tag of the packet; if the matching result is reject, the Egress device drops the packet. When forwarding the packet through the egress port of the Egress device, the Egress device strips the source role tag and the Vtag, i.e. the forwarded packet forwarded through the egress port of the Egress device is an untag packet.

The operation of matching the source role tag and the destination role information with the items in the RBACL may be performed before or after the operation of searching the layer-2 or layer-3 forwarding list.

If the packet received by the Egress device contains the source role tag and the Vtag, different from the processing for the packet only containing the source role tag, it is not needed to determine the Vtag according to the ingress port, and other processing is the same as the processing for the packet only containing the source role tag.

In the second application case shown in FIG. 3, the packet forwarding process inside the Egress device is the similar to that inside the Egress device in the first application case. However, the Egress device in FIG. 3 strips the source role tag at the egress port, i.e. the packet forwarded through the egress port of the Egress device contains the Vtag.

In the third application case shown in FIG. 4, if the packet received by the Egress device only contains the source role tag, when determining that the inner VLAN tag is the source role tag according to the TPID of the inner VLAN tag, the Egress device obtains the source role tag, determines the Vtag according to the ingress port, and inserts the Vtag into the packet. The Egress device searches the layer-3 forwarding list according to the Vtag and the destination IP address to determine the egress port, perform replacement processing for the Vtag, the source MAC address and the destination MAC address, determines destination role information corresponding to the destination address of the packet, matches the source role tag and the destination role information with the items in the RBACL, and performs access control processing for the packet according to the matching result. For example, if the matching result is permitting forwarding, the Egress device forwards the packet through the determined egress port after stripping all tags of the packet; if the matching result is rejecting forwarding, the Egress device drops the packet. When forwarding the packet through the egress port, the Egress device strips the source role tag and the new Vtag, i.e. the forwarded packet is an untag packet.

If the packet received by the Egress device contains the source role tag and the Vtag, different from the processing for the packet only containing the source role tag, it is not needed to determine the Vtag according to the egress port, and other processing is the same as the processing for the packet only containing the source role tag.

In the fourth application case shown in FIG. 5, the processing is the same as that in the third application case, except the Egress device strips only the source role tag at the egress port, i.e. the packet forwarded through the egress port contains the new Vtag.

In the above method provided by the examples of the present invention, the processing procedure for the inner VLAN tag and the processing procedure for the outer VLAN tag do not influence with each other, and after the source role tag as the inner VLAN tag is inserted, the processing performed by the devices for the outer VLAN tag and other packet fields is not influenced.

In addition, the above method is described by taking a unicast packet as an example. It should be noted that the processing mode for the source role tag is also applicable to multicast. After the Ingress device, the intermediate device or the Egress device performs layer-2 or layer-3 copying for the packet, the copied packet contains the source role tag which is the same as a multicast source packet.

The above method may be applied to both a CPU port and a common port of the network devices, and the logic processing of the CPU port is the same as that of the common port.

The forgoing is the detailed description of the method provided by the examples of the present invention, and the Ingress device, the intermediate device or the Egress device provided by the examples of the present invention will be described hereinafter in detail.

Figure 9:
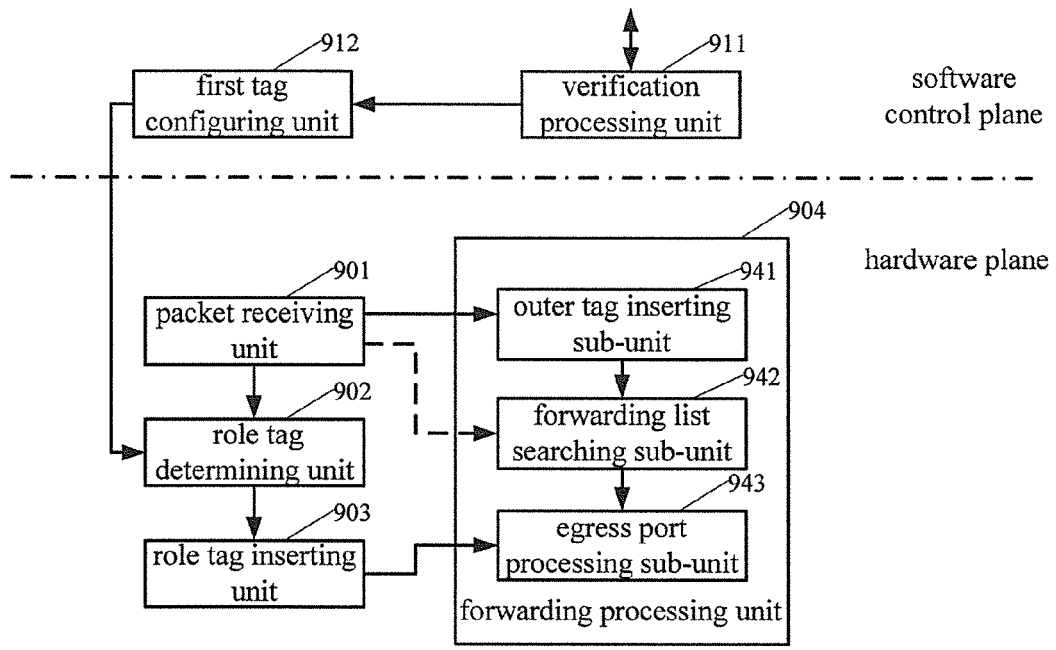
FIG. 9 is a schematic diagram illustrating the structure of an Ingress device in accordance with an example.

FIG. 9 is a schematic diagram illustrating the structure of an Ingress device in accordance with an example of the present invention. As shown in FIG. 9, the Ingress device includes a packet receiving unit 901, a role tag determining unit 902, a role tag inserting unit 903 and a forwarding processing unit 904.

The packet receiving unit 901 is configured to receive a packet from user equipment.

The role tag determining unit 902 is configured to determine a source role tag according to source information of the packet, where the source role tag corresponds to a role of the user equipment.

The role tag inserting unit 903 is configured to insert the source role tag as an inner VLAN of the packet into the packet.

The forwarding processing unit 904 is configured to forward the packet processed by the role tag inserting unit 903.

The packet receiving unit 901, the role tag determining unit 902, the role tag inserting unit 903 and the forwarding processing unit 904 are units in the hardware plane of the Ingress device, and can be implemented through a forwarding chip.

In addition, the Ingress device further includes a verification processing unit 911 and a first tag configuring unit 912 to configure related information in the hardware plane of the Ingress device.

The verification processing unit 911 is configured to forward a verification request from the user equipment to an access verification server.

The first tag configuring unit 912 is configured to obtain source role information of the user equipment issued by the access verification server, and applies a corresponding relation between the Ingress device's ingress port receiving the verification request and the source role tag corresponding to the source role information of the user equipment to the hardware plane of the Ingress device. Specifically, the first tag configuring unit 912 converts the source role information of the user equipment into the source role tag, and applies the corresponding relation between the Ingress device's ingress port receiving the verification request and the source role tag to the hardware plane of the Ingress device.

The role tag determining unit 902 performs, according to the corresponding relation applied to the hardware plane of the Ingress device, an operation of determining the source role tag according to the source information of the packet. The source information of the packet is the Ingress device's ingress port receiving the packet.

Figure 10:
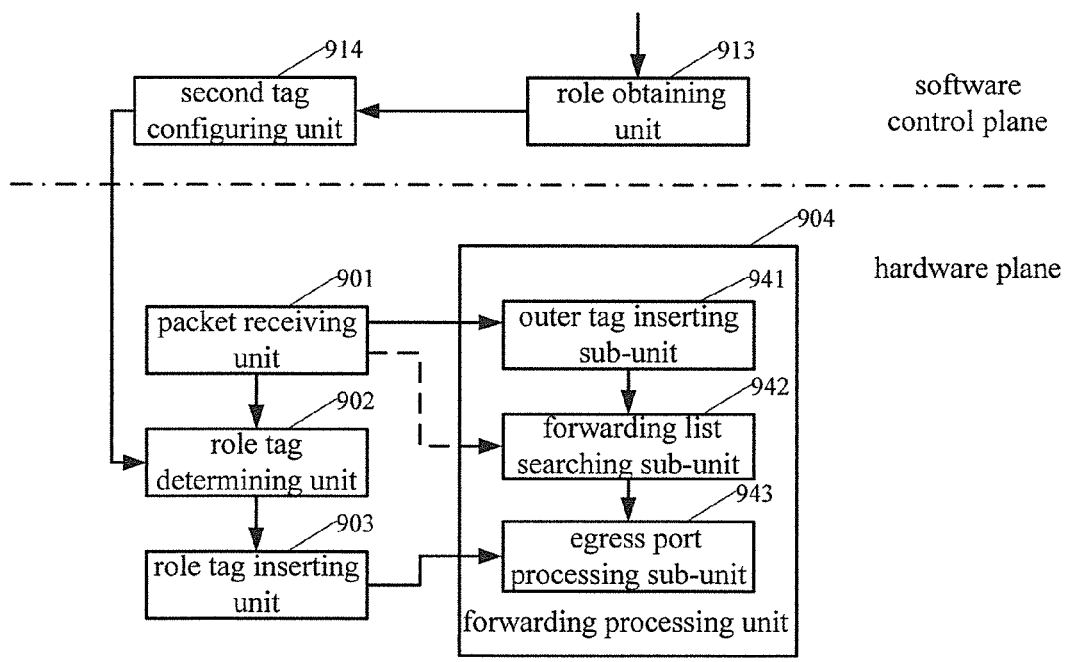
FIG. 10 is a schematic diagram illustrating the structure of an Ingress device in accordance with another example.

In a different network structure, if there is a common device between the Ingress device and the user equipment and the Ingress device interacts with the access verification server through the common device, the Ingress device may adopt another structure, as shown in FIG. 10. In this structure, a role obtaining unit 913 and a second tag configuring unit 914 are used to configure related information in the hardware plane of the Ingress device.

The role obtaining unit 913 is configured to obtain from the common device a corresponding relation between the source role information of the user equipment and the source address information or protocol number of the verification request, where the source role information of the user equipment is issued to the common device by the access verification server after the common device forwards the verification request of the user equipment to the access verification server.

The second tag configuring unit 914 is configured to apply the corresponding relation between the source role tag corresponding to the source role information of the user equipment and the source address information or protocol number of the packet to the hardware plane of the Ingress device.

The role tag determining unit 902 performs, according to the corresponding relation applied to the hardware plane of the Ingress device, an operation of determining the source role tag according to the source information of the packet. The source information of the packet is the source address information or protocol number of the packet.

The verification processing unit 911, the first tag configuring unit 912, the role obtaining unit 913 and the second tag configuring unit 914 are units in the software control plane of the Ingress device.

Specifically, when the role tag inserting unit 903 inserts the source role tag as the inner VLAN tag into the packet, the TPID of the inner VLAN tag is configured as a preset value unequal to 0X8100.

The forwarding processing unit 904 in the Ingress device includes an outer tag inserting sub-unit 941, a forwarding list searching sub-unit 942 and an egress port processing sub-unit 943.

The outer tag inserting sub-unit 941 is configured to determine a Vtag of the packet when the packet received by the packet receiving unit 901 does not contain the Vtag, and insert the Vtag into the packet.

The forwarding list searching sub-unit 942 is configured to search a layer-2 or layer-3 forwarding list according to the Vtag and destination address information contained in the packet which is received by the packet receiving unit 901 or according to the Vtag and the destination address information contained in the packet which has been processed by the outer tag inserting sub-unit 941.

The egress port processing sub-unit 943 is configured to strip or not to strip the Vtag contained in the packet, and forward the packet containing the source role tag through the determined egress port. Whether the Vtag needs to be stripped or not to be stripped depends on the configuration of the egress port.

When performing layer-3 forwarding, the forward processing unit 904 further includes a sub-unit for performing replacement processing for the Vtag, a source MAC address and a destination MAC address. Since the sub-unit for performing replacement processing is similar to the conventional methods, the sub-unit is not shown in drawings and will not be further described herein.

The Ingress device may insert the source role tag into the packet when the ingress device's ingress port receives the packet, when the ingress device's egress port forwards the packet, or at any moment after the ingress device's ingress port receives the packet and before the ingress device's egress port forwards the packet. The technical solutions shown in FIGS. 9 and 10 are described by taking an example that the source role tag is inserted into the packet when the ingress device's egress port forwards the packet.

Figure 11:
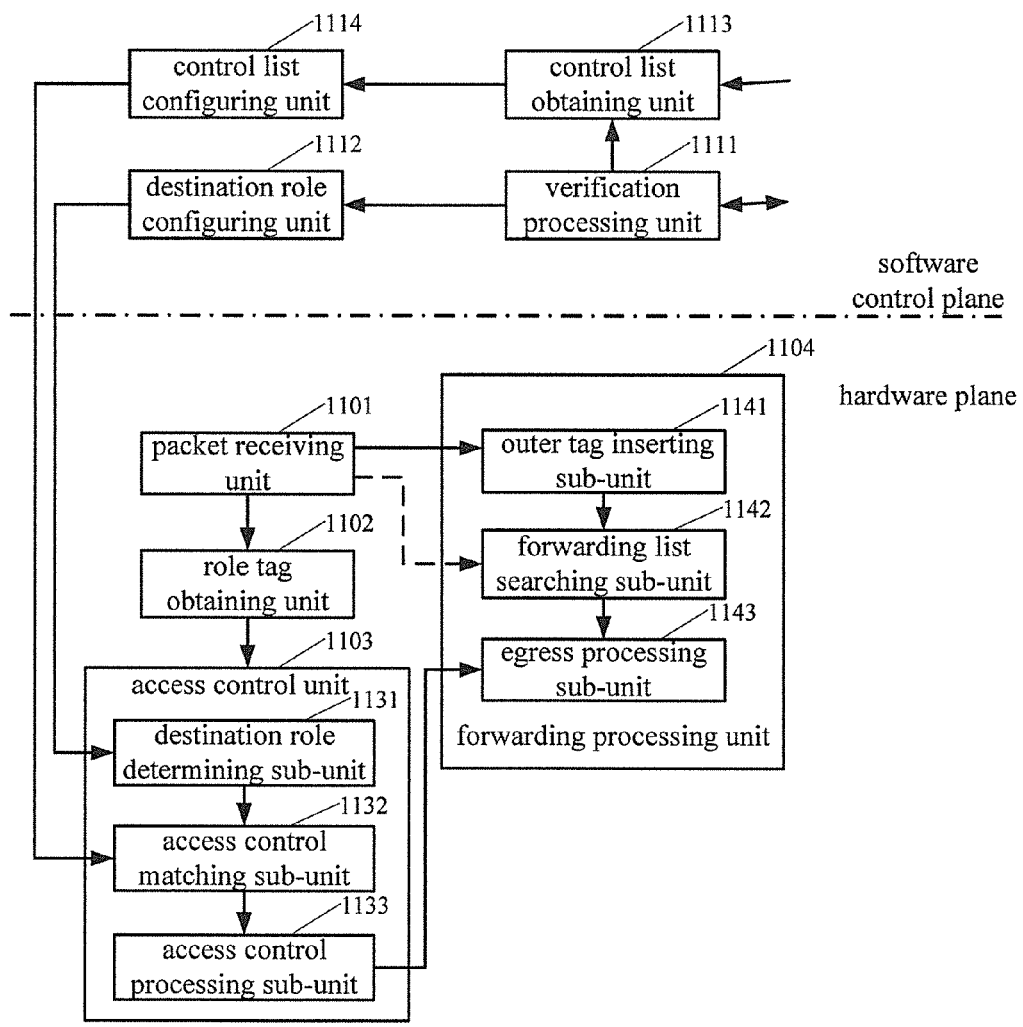
FIG. 11 is a schematic diagram illustrating the structure of an Egress device in accordance with an example.

FIG. 11 is a schematic diagram illustrating the structure of an Egress device in accordance with an example of the present invention. As shown in FIG. 11, the Egress device includes a packet receiving unit 1101, a role tag obtaining unit 1102 and an access control unit 1103.

The packet receiving unit 1101 is configured to receive a packet from user equipment.

The role tag obtaining unit 1102 is configured to obtain a source role tag as an inner VLAN tag, where the source role tag corresponds to a role of the user equipment transmitting the packet.

The access control unit 1103 is configured to perform role based access control processing according to the source role tag.

The packet receiving unit 1101, the role tag obtaining unit 1102 and the access control unit 1103 are units in the hardware plane of the Egress device, and can be implemented through a forwarding chip.

The access control unit 1103 includes a destination role determining sub-unit 1131, an access control matching sub-unit 1132 and an access control processing sub-unit 1133.

The destination role determining sub-unit 1131 is configured to determine destination role information of the packet.

The access control matching sub-unit 1132 is configured to match the source role tag and the destination role information with items in the RBACL.

The access control processing sub-unit 1133 is configured to perform access control processing for the packet according to a matching result of the access control matching sub-unit 1132.

In addition, the Egress device further includes a verification processing unit 1111, a destination role configuring unit 1112, a control list obtaining unit 1113 and a control list configuring unit 1114 to configure related information in the hardware plane.

The verification processing unit 1111 is configured to forwards a verification request from a resource side device to an access verification server, and obtain the destination role information of the resource side device issued by the access verification server.

The destination role configuring unit 1112 is configured to apply a corresponding relation between the source address information of the verification request from the resource side device and the destination role information of the resource side device to the hardware plane of the Egress device.

The control list obtaining unit 1113 is configured to obtain a role based control policy, wherein, the role based control policy contains the source role information, destination role information and access control mode.

The control list configuring unit 1114 is configured to convert source role information in the role based control policy into the source role tag, obtain a RBACL, and apply the RBACL to the hardware plane of the Egress device, wherein, the each item in the RBACL contains source role tag, destination role information and access control mode.

The destination role determining sub-unit 1131 determines the destination role information corresponding to the destination address in the packet from the user equipment according to the corresponding relation applied to the hardware plane. The access control matching sub-unit 1132 performs matching processing for the RBACL applied to the hardware plane.

The verification processing unit 1111, the destination role configuring unit 1112, the control list obtaining unit 1113 and the control list configuring unit 1114 are units in the software control plane.

The Egress device further includes a forwarding processing unit 1104, and the forwarding processing unit 1104 includes an outer tag inserting sub-unit 1141, a forwarding list searching sub-unit 1142 and an egress processing sub-unit 1143.

The outer tag inserting sub-unit 1141 is configured to determine a Vtag of the packet when the packet received by the packet receiving unit 1101 does not contain the Vtag, and insert the Vtag as the outer VLAN tag into the packet.

The forwarding list searching sub-unit 1142 is configured to search a layer-2 or layer-3 forwarding list according to the Vtag and the destination address information contained in the packet which is received by the packet receiving unit 1101 or according to the Vtag and the destination address information contained in the packet which has been processed by the outer tag inserting sub-unit 1141.

The egress processing sub-unit 1143 is configured to strip the source role tag of the packet, and after stripping or not stripping the Vtag contained in the packet and when the access control unit 1103 determines to forward the packet, forward the packet through the determined egress port.

In addition, when performing layer-3 forwarding, the forwarding processing unit 1104 further includes a unit for performing replacement processing for the Vtag, the source MAC address and the destination MAC address of the packet. Since the sub-unit for performing replacement processing belongs to conventional protocols, the sub-unit is not shown in drawings and will not be further described herein.

FIG. 12 is a schematic diagram illustrating the structure of an intermediate device in accordance with an example of the present invention. As shown in FIG. 12, the intermediate device includes: a packet receiving unit 1201, a tag identifying unit 1202 and a forwarding processing unit 1203.

The packet receiving unit 1201 is configured to receive a packet from an Ingress device or another intermediate device.

The tag identifying unit 1202 is configured to identify an inner VLAN tag of the packet.

The forwarding processing unit 1203 is configured to keep the inner VLAN tag unchangeable when the tag identifying unit 1202 determines during the forwarding procedure of the packet that the inner VLAN tag is the source role tag. The inner VLAN tag corresponds to the role of the user equipment transmitting the packet.

If the tag identifying unit 1202 determines that the TPID of the inner VLAN tag is a preset value unequal to 0X8100, and the tag identifying unit 1202 determines that the inner VLAN tag is the source role tag.

The forwarding processing unit 1203 includes an outer tag inserting sub-unit 1231, a forwarding list searching sub-unit 1232 and an egress port processing sub-unit 1233.

The outer tag inserting sub-unit 1231 is configured to determine a Vtag of the packet when the packet from the user equipment received by the packet receiving unit 1201 does not contain the Vtag, and insert the Vtag into the packet.

The forwarding list searching sub-unit 1232 is configured to search a layer-2 or layer-3 forwarding list according to the Vtag and the destination address information contained in the packet which is received by the packet receiving unit 1201 or according to the Vtag and the destination address information contained in the packet which has been processed by the outer tag inserting sub-unit 1231.

The egress port processing sub-unit 1233 is configured to forward the packet containing the source role tag through the determined egress port after stripping or not stripping the Vtag contained in the packet.

In addition, when performing layer-3 forwarding, the forwarding processing unit 1104 further includes a unit for performing replacement processing for the Vtag, the source MAC address and the destination MAC address of the packet. Since the sub-unit for performing replacement processing belongs to conventional protocols, the sub-unit is not shown in drawings and will not be further described herein.

The packet receiving unit 1201, the tag identifying unit 1202 and the forwarding processing unit 1203 are units in the hardware plane of the intermediate device, and can be implemented through a forwarding chip.

It should be noted that all units in the hardware planes of the Ingress device, the intermediate device and the Egress device can be integrated in a forwarding chip. When determining to implement the functions of the Ingress device, the forwarding chip executes the functions of units in the hardware plane of the Ingress device; when determining to implement the functions of the intermediate device, the forwarding chip executes the functions of units in the hardware plane of the intermediate device; when determining to implement the functions of the Egress device, the forwarding chip executes the functions of units in the hardware plane of the Egress device.

The foregoing are only preferred examples of the present invention and are not for use in limiting the protection scope of the present invention. Any modification, equivalent replacement and improvement made within the scope of the present invention should be covered under the protection scope of the present invention.

What is claimed is:

1. A method for processing source role information, applied to a network comprising an Ingress device and an Egress device, comprising:
   the Ingress device receiving a packet from user equipment, converting source role information of the user equipment received from an access verification server into a source role tag, inserting the source role tag into the packet as an inner Virtual Local Area Network (VLAN) tag of the packet, and forwarding the packet to the Egress device, wherein the source role tag corresponds to a role of the user equipment; and
   the Egress device receiving the packet, obtaining the source role tag from the inner VLAN tag of the packet, and performing role based access control processing for the packet based on said source role tag.

2. The method of claim 1, further comprising:
   after receiving a verification request of the user equipment, forwarding, by the Ingress device, the verification request to the access verification server, obtaining the source role information of the user equipment from the access verification server to convert into the inner VLAN tag, and applying a corresponding relation between the Ingress device's ingress port receiving the verification request and the inner VLAN tag to a hardware plane of the Ingress device; and
   determining the source role tag corresponding to the Ingress device's ingress port receiving the verification request according to the corresponding relation applied to the hardware plane of the Ingress device.

3. The method of claim 1, further comprising:
   forwarding, by a common device, a verification request of the user equipment to the access verification server, obtaining source role information of the user equipment issued by the access verification server, and transmitting a corresponding relation between the source role information of the user equipment and source address information of the verification request to the Ingress device;
   applying, by the Ingress device, the corresponding relation between the source role tag corresponding to the source role information of the user equipment and the source address information or protocol number of the verification request to a hardware plane of the Ingress device; and
   determining the source role tag corresponding to the source address information or protocol number of the packet according to the corresponding relation applied to the hardware plane of the Ingress device.

4. The method of claim 1, wherein performing role based access control processing for the packet comprises:
   determining, by the Egress device, destination role information of the packet, matching the source role tag and the destination role information with items in a Role Based Access Control List (RBACL), and performing access control processing for the packet according to a matching result.

5. The method of claim 4, further comprising:
   after receiving a verification request of a resource side device, forwarding, by the Egress device, the verification request to the access verification server, obtaining destination role information of the resource side device issued by the access verification server, and applying a corresponding relation between source address information of the verification request and the destination role information of the resource side device to a hardware plane of the Egress device;
   obtaining a role based control policy from the access verification server, wherein the destination role information of the resource side device issued by the access verification server is taken as destination role information;
   converting source role information into the source role tag, obtaining a RBACL, and applying the RBACL to the hardware plane of the Egress device; wherein, the RBACL contains source role tag, destination role information and access control mode;
   determining the destination role information of the packet from the user equipment comprises: determining the destination role information corresponding to the destination address information of the packet from the user equipment according to the corresponding relation applied to the hardware plane of the Egress device; and
   performing, by the Egress device, matching processing according to the RBACL applied to the hardware plane of the Egress device.

6. The method of claim 1, further comprising:
   setting a Tag Protocol Identity (TPID) of the inner VLAN tag to a preset value unequal to 0X8100 to identify the inner VLAN tag as the source role tag;
   keeping, by an intermediate device connected between the user equipment and the Ingress device, the inner VLAN tag unchangeable when determining that the TPID of the inner VLAN tag of the packet is the preset value; and
   obtaining, by the Egress device, the source role tag as the inner VLAN tag from the packet when determining that the TPID of the inner VLAN tag of the packet is the preset value.

7. The method of claim 1, wherein forwarding processing performed by the Ingress device comprises:
   A1) if the packet does not contain an outer VLAN tag (Vtag), determining the Vtag of the packet, inserting the Vtag into the packet, and performing a step A2); if the packet contains a Vtag, directly performing the step A2);
   A2) searching a layer-2 or layer-3 forwarding list according to the Vtag contained in the packet and the destination address information of the packet to determine an egress port;
   A3) stripping or not stripping the Vtag, and forwarding the packet containing the source role tag through the determined egress port.

8. The method of claim 1, further comprising:
B1) if the packet does not contain an outer VLAN tag (Vtag), determining, by the Egress device, the Vtag of the packet, inserting the Vtag into the packet, and performing a step B2); if the packet contains a Vtag, directly performing the step B2);
B2) searching a layer-2 or layer-3 forwarding list according to the Vtag contained in the packet and the destination address information of the packet to determine an egress port;
B3) stripping the source role tag of the packet, stripping or not stripping the Vtag, and forwarding the packet through the determined egress port when the access control processing indicates to forward the packet.

9. An Ingress device, comprising:
a packet receiving unit to receive a packet from user equipment;
a role tag determining unit, configured to determine a source role tag for the packet, including converting source role information of the user equipment received from an access verification server into the source role tag, where the source role tag corresponds to a role of the user equipment;
a role tag inserting unit to insert the source role tag into the packet as an inner Virtual Local Area Network (VLAN) tag of the packet; and
a forwarding processing unit to forward the packet.

10. The Ingress device of claim 9, further comprising a verification processing unit and a first tag configuring unit; wherein
the verification processing unit is to forward a verification request from the user equipment to the access verification server;
the first tag configuring unit is to obtain source role information of the user equipment from the access verification server, convert the source role information of the user equipment obtained from the access verification server into the source role tag, and apply a corresponding relation between the Ingress device's ingress port receiving the verification request and source role tag to a hardware plane of the Ingress device; and
the role tag determining unit is to perform, according to the corresponding relation applied to the hardware plane of the Ingress device, an operation of determining the source role tag according to the source information of the packet, wherein the source information of the packet includes the Ingress device's ingress port receiving the packet.

11. The Ingress device of claim 10, further comprising: a role obtaining unit and a second tag configuring unit; wherein the role obtaining unit is to obtain from a common device a corresponding relation between source role information of the user equipment and source address information or protocol number of the verification request, wherein the source role information of the user equipment is issued to the common device by the access verification server after the common device forwards the verification request of the user equipment to the access verification server;
the second tag configuring unit is to apply the corresponding relation between the source role tag corresponding to the role information of the user equipment and the source address information or protocol number of the packet to the hardware plane of the Ingress device; and
the role tag determining unit is to perform, according to the corresponding relation applied to the hardware plane of the Ingress device, an operation of determining the source role tag according to the source information of the packet, wherein the source information of the packet is the source address information or protocol number of the packet.

12. The Ingress device of claim 9, wherein when the role tag inserting unit inserts the source role tag into the packet as the inner VLAN tag of the packet, and sets a Tag Protocol Identity (TPID) of the inner VLAN tag to a preset value unequal to 0X8100.

13. The Ingress device of claim 9, wherein the forwarding processing unit comprises:
an outer tag inserting sub-unit to determine an outer Virtual Local Area Network (VLAN) tag (Vtag) of the packet when the packet received by the packet receiving unit does not contain the Vtag, and insert the Vtag into the packet;
a forwarding list searching sub-unit to search a layer-2 or layer-3 forwarding list according to the Vtag and destination address information contained in the packet which is received by the packet receiving unit or according to the Vtag and the destination address information contained in the packet which has been processed by the outer tag inserting sub-unit; and
an egress port processing sub-unit to strip the Vtag contained in the packet, and forward the packet containing the source role tag through a determined egress port.

14. An Egress device, comprising:
a packet receiving unit to receive a packet from user equipment via an Ingress device;
a role tag obtaining unit to obtain a source role tag from an inner Virtual Local Area Network (VLAN) tag of the packet, wherein the source role tag was inserted into the packet by the Ingress device after converting source role information of the user equipment received from an access verification server into the source role tag;
an access control unit to perform role based access control processing for the packet according to the source role tag.

15. The Egress device of claim 14, wherein the access control unit comprises:
a destination role determining sub-unit to determine destination role information of the packet;
an access control matching sub-unit to match the source role tag and the destination role information with items in a Role Based Access Control List (RBACL); and
an access control processing sub-unit to perform access control processing for the packet according to a matching result of the access control matching sub-unit.

16. The Egress device of claim 15, further comprising a verification processing unit, a destination role configuring unit, a control list obtaining unit and a control list configuring unit; wherein
the verification processing unit is to forward a verification request from a resource side device to the access verification server, and obtain destination role information of the resource side device issued by the access verification server;
the destination role configuring unit is to apply a corresponding relation between source address information of the verification request from the resource side device and the destination role information of the resource side device to a hardware plane of the Egress device; and
the control list obtaining unit is to obtain a role based control policy, wherein the role based control policy contains source role tag, destination role information and access control mode;
the control list configuring unit is to convert the source role information into the source role tag, obtain the RBACL, and apply the RBACL to the hardware plane of the Egress device, wherein the RBACL contains source role tag, destination role information and access control mode;

the destination role determining sub-unit is to determine the destination role information corresponding to a destination address of the packet from the user equipment according to the corresponding relation applied to the hardware plane of the Egress device; and the access control matching sub-unit is to perform matching processing for the RBACL applied to the hardware plane of the Egress device.

17. The Egress device of claim 14 further comprising a forwarding processing unit; wherein the forwarding processing unit comprises:

an outer tag inserting sub-unit to determine an outer Virtual Local Area Network (VLAN) tag (Vtag) of the packet when the packet received by the packet receiving unit does not contain the Vtag, and insert the Vtag into the packet;

a forwarding list searching sub-unit to search a layer-2 or layer-3 forwarding list according to the Vtag and the destination address information contained in the packet which is received by the packet receiving unit or according to the Vtag and the destination address information contained in the packet which has been processed by the outer tag inserting sub-unit; and an egress port processing sub-unit, configured to strip the source role tag of the packet, and after stripping or not stripping the Vtag contained in the packet and when the access control unit determines to forward the packet, forward the packet through the determined egress port.

18. An intermediate device, comprising:
a packet receiving unit to receive a packet from an Ingress device;

a tag identifying unit to identify an inner Virtual Local Area Network (VLAN) tag of the packet as a source role tag, wherein the source role tag was inserted into the packet by the Ingress device after converting source role information of the user equipment received from an access verification server into the source role tag; and a forwarding processing unit to forward the packet and keep the inner VLAN tag unchanged when the tag identifying unit determines that the inner VLAN tag is a source role tag, wherein the inner VLAN tag corresponds to a role of user equipment transmitting the packet.

19. The intermediate device of claim 18, wherein the tag identifying unit determines that the inner VLAN tag is a source role tag when determining a Tag Protocol Identity (TPID) of the inner VLAN tag is a preset value unequal to 0X8100.

20. The intermediate device of claim 18, wherein the forwarding processing unit comprises:

an outer tag inserting sub-unit to determine an outer Virtual Local Area Network (VLAN) tag (Vtag) of the packet when the packet received by the packet receiving unit does not contain the Vtag, and insert the Vtag into the packet;

a forwarding list searching sub-unit to search a layer-2 or layer-3 forwarding list according to the Vtag and destination address information contained in the packet which is received by the packet receiving unit or according to the Vtag and the destination address information contained in the packet which has been processed by the outer tag inserting sub-unit; and an egress port processing sub-unit to forward the packet containing the source role tag through the determined egress port after stripping the Vtag contained in the packet.

* * * * *

UNITED STATES PATENT AND TRADEMARK OFFICE
CERTIFICATE OF CORRECTION

| | | |
|---|---|---|
| PATENT NO. | : 9,088,437 B2 | |
| APPLICATION NO. | : 13/699540 | |
| DATED | : July 21, 2015 | |
| INVENTOR(S) | : Yubing Song et al. | |

It is certified that error appears in the above-identified patent and that said Letters Patent is hereby corrected as shown below:

In the claims,

In column 17, line 18, in Claim 9, delete "unit, configured" and insert -- unit --, therefor.

Signed and Sealed this
Twelfth Day of January, 2016

Michelle K. Lee
*Director of the United States Patent and Trademark Office*